Patented July 12, 1949

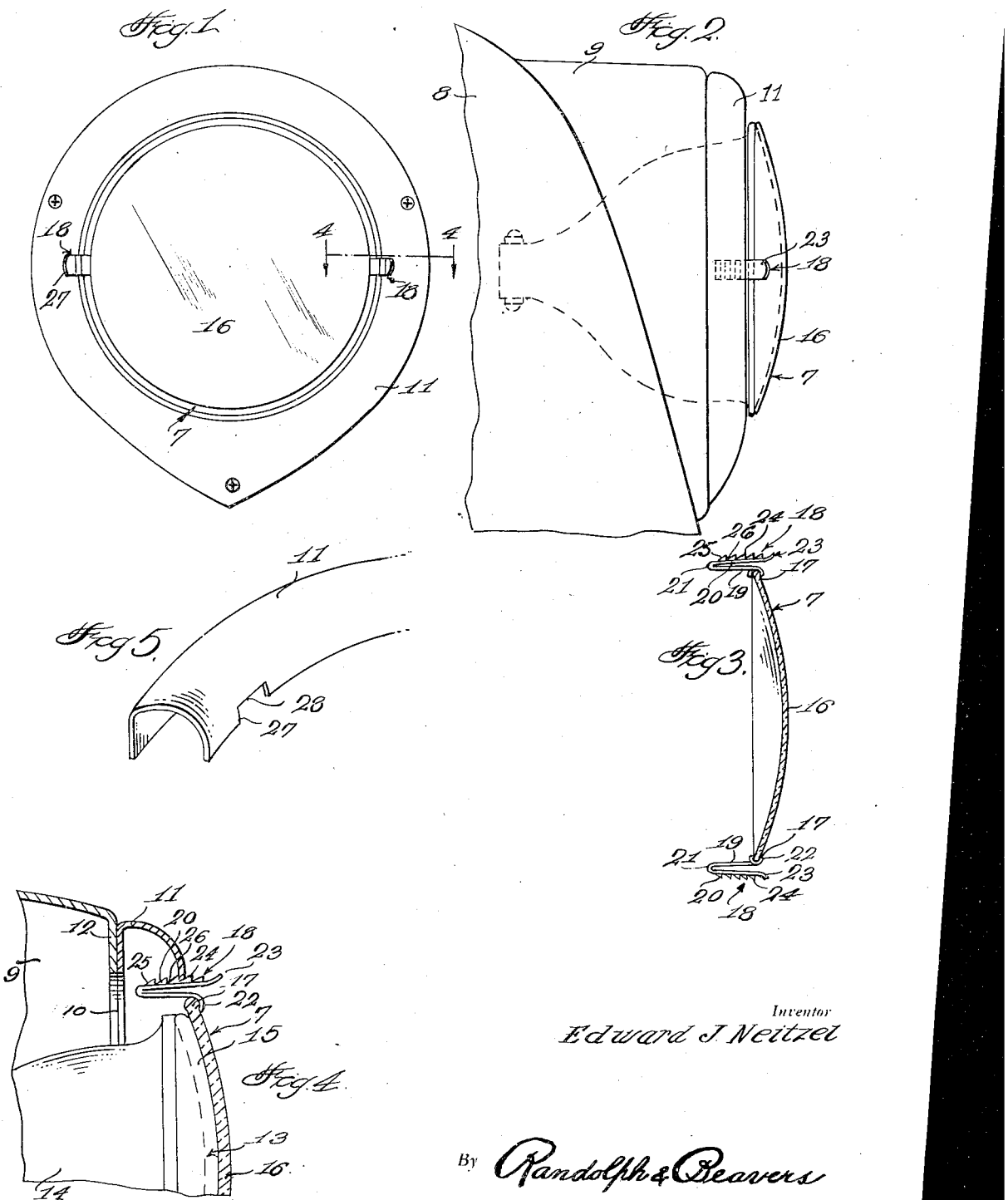

2,476,109

UNITED STATES PATENT OFFICE 2,476,109

HEADLIGHT ATTACHMENT

Edward J. Neitzel, Paterson, N. J.

Application December 27, 1946, Serial No. 718,861

2 Claims. (Cl. 240—46.59)

This invention relates to a lens attachment for headlights and which is adapted to be detachably disposed over a headlight lens and for converting the headlight to a fog light.

More particularly, it is an object of the present invention to provide an attachment of extremely simple construction which may be conveniently carried in a motor vehicle and stored, as for example, in the glove compartment when not in use and which can be quickly and easily applied to the headlights of the vehicle for converting said headlights into fog lights for use in foggy or inclement weather when conventional headlights do not possess sufficient penetrating effect through a fog or other weather condition to afford the driver of the vehicle adequate visibility.

Another object of the invention is to provide a fog lens attachment which is so constructed that it can be quickly and easily applied to or removed from conventional headlights and which, when applied, will be positioned so that a colored lens portion thereof will completely overlie the conventional headlight lens.

Various other objects and advantages of the invention will hereinafter become more fully apparent from the following description of the drawing, illustrating a preferred embodiment thereof, and wherein:

Figure 1 is a front elevational view showing a preferred embodiment of the invention applied to a conventional headlight;

Figure 2 is a side elevational view thereof;

Figure 3 is a substantially central horizontal sectional view of the attachment;

Figure 4 is a fragmentary horizontal sectional view, partly in top plan, taken substantially along a plane as indicated by the line 4—4 of Figure 1, and Figure 5 is a fragmentary perspective view of a portion of the headlight rim.

Referring more specifically to the drawing, for the purpose of illustrating one application of the preferred embodiment of the attachment, comprising the invention, designated generally 7 and which is illustrated in Figures 1 to 5, a portion of a front fender 8 of a motor vehicle, not shown, is shown provided with a forwardly extending integral housing portion 9 having an open forward end 10 surrounded by an externally disposed rim 11 which may be secured in any manner to the inwardly extending annular flange 12 of the housing 9 and which defines the open end 10 or which may be formed integral therewith. The rim 11 is substantially of channel-shape cross section; the channel of which is disposed to open inwardly. The parts 9, 10, 11 and 12 constitute one conventional form of headlight casing for detachably mounting a headlight, designated generally 13 and ordinarily of the sealed beam type including a reflector 14, containing a light source, not shown, and a lens 15 which is sealed to and closes the open front of the reflector 14 and which combines therewith to form a complete removable headlight unit. The lens 15, as illustrated, is generally circular but may be of other shape and is bulged outwardly relatively to the open front of the reflector 14.

The attachment 7 comprises a concavo-convex lens 16, preferably of a colored transparent or translucent material which is substantially nonbreakable. The lens 16 is adapted to fit over and completely cover the headlight lens 15 and to have a rim or edge portion 17 which projects outwardly slightly beyond the edge of the lens 15. At a plurality of points, preferably two diametrically opposed points, the lens 16 is provided with a resilient retaining clip, designated generally 18. Each retaining clip 18 is formed from an elongated strip preferably of spring metal which is folded upon itself at a point substantially intermediate of its ends to form the legs 19 and 20 which diverge from the bight 21 of the clip 18. The free end of the leg 19 is curved outwardly and engages around a portion of the lens rim 17, as seen at 22 and may be rigidly secured thereto in any suitable manner and so that the clip 18 will project inwardly therefrom, as clearly illustrated in Figures 3 and 4. The other leg 20 of the clip 18 extends to beyond the free end of the leg 19 and terminates in an outwardly curved finger grip portion 23, for a purpose which will hereinafter become apparent. Between the portion 23 and the bight 21, the leg 20 is provided on its outer side with longitudinally spaced outwardly projecting teeth 24 having inwardly inclined inner inclined faces 25 and outer substantially straight faces 26 which are disposed substantially perpendicular to the leg 20.

The outer edge of the rim 11 at diametrically opposed points is provided with notches 27 having inner substantially straight edges 28 which are disposed substantially parallel to the edges of the rim 11. To apply the fog lens attachment 7, the finger grips 23 of the two spring clips 18 are grasped and forced inwardly toward the legs 19 and the lens 16 is then positioned over the headlight lens 15 by inserting the clips 18, with the bight portions 21 thereof as their leading ends, into the notches 27 until the lens 16 is disposed flush against the outer side of the lens 15. The finger grip portions 23 are then released to permit the legs 20 to spring outwardly and so that one of the outer faces 26 of each clip 18 will bear against the inner side of the rim 11 adjacent an edge 28 of a notch 27, to thereby detachably mount the fog lens attachment 7 on the headlight. It will be readily obvious that an attachment 7 will be employed with each of the headlights.

It will be readily apparent that only one embodiment of headlight has been illustrated and that the attachment 7 may be equally well employed with other types of headlights, such as headlights having separable reflectors and lenses and headlights which are mounted in casings or housings separate from the vehicle fenders. Likewise, the fog lens attachment could be utilized with other types of illuminating means such as spotlights.

Various other modifications and changes are likewise contemplated and may obviously be resorted to, without departing from the spirit or scope of the invention as hereinafter defined by the appended claims.

I claim as my invention:

1. In an attachment for headlights or the like, a translucent colored lens adapted to be detachably disposed against the outer side of a headlight lens, and resilient retaining means fixedly mounted on the rim portion of said lens and adapted to resiliently and detachably engage portions of the headlight for detachably mounting said lens thereon, said resilient means comprising a plurality of spring clips extending inwardly from said lens and having outer, resilient legs provided with serrated outer surfaces adapted to detachably engage portions of the rim of the headlight.

2. In an attachment for headlights or the like, a translucent colored lens adapted to be detachably disposed against the outer side of a headlight lens, and resilient retaining means fixedly mounted on the rim portion of said lens and adapted to resiliently and detachably engage portions of the headlight for detachably mounting said lens thereon, said resilient means comprising a plurality of spring clips having resilient, diverging leg portions, the free end of one of the leg portions of each clip being secured to a portion of the rim of the lens, said clips being disposed to project from the inner side of said lens rim, and the outer leg of each clip being provided with longitudinally spaced teeth on the outer side thereof adapted to selectively engage a portion of the headlight rim for detachably mounting the attachment.

EDWARD J. NEITZEL.

REFERENCES CITED

The following references are of record in the file of this patent:

UNITED STATES PATENTS

| Number | Name | Date |
| --- | --- | --- |
| 1,163,590 | Dobes | Dec. 7, 1915 |
| 1,856,073 | Graham | May 3, 1932 |
| 2,107,801 | Query | Feb. 8, 1938 |
| 2,158,121 | Hirschberg | May 16, 1939 |
| 2,349,853 | Ebert | May 30, 1944 |

FOREIGN PATENTS

| Number | Country | Date |
| --- | --- | --- |
| 666,722 | Germany | 1938 |